(12) United States Patent  
Sheinbein et al.

(10) Patent No.: US 8,611,360 B2
(45) Date of Patent: Dec. 17, 2013

(54) SYSTEM FOR PROCESSING A CALL WITH A TDM NETWORK AND ROUTING THE CALL WITH AN IP NETWORK

(75) Inventors: Daniel Sheinbein, Boca Raton, FL (US); Ellen B. Feinberg, Morganville, NJ (US); Saul Daniel Fishman, Highland Park, NJ (US); Walter Paul Zahray, Matawan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 481 days.

(21) Appl. No.: 12/968,907

(22) Filed: Dec. 15, 2010

(65) Prior Publication Data

US 2012/0155479 A1  Jun. 21, 2012

(51) Int. Cl.
*H04L 12/28* (2006.01)

(52) U.S. Cl.
USPC ............ 370/401; 370/356; 370/352; 370/410

(58) Field of Classification Search
USPC .......................................................... 370/401
See application file for complete search history.

(56) References Cited

U.S. PATENT DOCUMENTS

| | | | | |
|---|---|---|---|---|
| 6,477,164 | B1 * | 11/2002 | Vargo et al. | 370/356 |
| 6,765,912 | B1 * | 7/2004 | Vuong | 370/395.2 |
| 6,801,523 | B1 * | 10/2004 | Osman | 370/352 |
| 6,940,849 | B2 * | 9/2005 | Eichen et al. | 370/352 |
| 7,133,417 | B1 * | 11/2006 | Kao et al. | 370/467 |
| 7,257,109 | B2 * | 8/2007 | Sylvain | 370/352 |
| 7,333,480 | B1 * | 2/2008 | Clarke et al. | 370/352 |
| 7,424,106 | B2 * | 9/2008 | Somes et al. | 379/221.02 |
| 7,630,359 | B1 * | 12/2009 | Cherchali et al. | 370/352 |
| 7,881,451 | B2 * | 2/2011 | Chang | 379/218.01 |
| 8,072,967 | B2 * | 12/2011 | Rosenberg et al. | 370/352 |
| 8,089,958 | B2 * | 1/2012 | Elliott et al. | 370/356 |
| 8,090,082 | B2 * | 1/2012 | Gilbert et al. | 379/88.14 |
| 8,179,905 | B1 * | 5/2012 | Napierala et al. | 370/401 |
| 8,194,640 | B2 * | 6/2012 | Ramachandran et al. | 370/352 |
| 8,199,746 | B2 * | 6/2012 | Rosenberg et al. | 370/353 |
| 8,228,902 | B2 * | 7/2012 | Mehmood et al. | 370/353 |
| 8,228,903 | B2 * | 7/2012 | Rosenberg et al. | 370/353 |
| 8,228,904 | B2 * | 7/2012 | Rosenberg et al. | 370/353 |
| 2006/0239252 | A1 * | 10/2006 | Kantak et al. | 370/352 |
| 2008/0089327 | A1 * | 4/2008 | Lu et al. | 370/389 |
| 2009/0022148 | A1 * | 1/2009 | Anders | 370/356 |
| 2009/0109958 | A1 * | 4/2009 | La Pierre et al. | 370/352 |
| 2010/0091975 | A1 * | 4/2010 | Sheth et al. | 379/220.01 |
| 2011/0007736 | A1 * | 1/2011 | Terpstra et al. | 370/352 |
| 2011/0051714 | A1 * | 3/2011 | Somes | 370/352 |
| 2012/0063576 | A1 * | 3/2012 | Gilbert et al. | 379/93.01 |

* cited by examiner

*Primary Examiner* — Ian N Moore
*Assistant Examiner* — Lakeram Jangbahadur
(74) *Attorney, Agent, or Firm* — Akerman LLP; Michael K. Dixon; Roy Zachariah

(57) ABSTRACT

A system for processing calls with a time division multiplexing (TDM) network and routing the calls via an internet protocol network is disclosed. The system may receive a call from a call originating device. The call may then be routed to a time division multiplexing switch at which call processing is performed to determine routing information for the call. The routing information may then be received at a first VoIP media gateway, and the call may then be routed by the first VoIP media gateway. Once the call is answered, the connection between the time division multiplexing switch and the VoIP media gateway may be terminated to enable the total number of terminations to be reduced, thereby creating a more efficient system.

19 Claims, 2 Drawing Sheets

SYSTEM FOR PROCESSING A CALL WITH A TDM NETWORK AND ROUTING THE CALL WITH AN IP NETWORK

FIELD OF THE INVENTION

The present application relates to call processing and, more particularly, to a system for call processing using a time division multiplexing (TDM) network for providing the service processing of a call and then using an internet protocol network for routing of the call.

BACKGROUND

Currently, long distance calls may be handled by systems associated with a Time Division Multiplexing (TDM) network or may be handled by systems associated with a Voice Over Internet Protocol (VoIP) network. Frequently, these systems have services that are not present in the other system. For instance, there exists TDM call processing and functionality that is not available in the VoIP system. Nevertheless, the same call processing and functionality of the TDM network is desired for calls carried by the VoIP network.

SUMMARY

A system for processing calls in a network is disclosed. In particular, the system may be utilized for processing calls with a time division multiplexing (TDM) network and for routing the calls via an internet protocol (IP) network. The system may receive a call from a call originating device. The call may be a time division multiplexing call, a VoIP call or other call. The call may be routed to a time division multiplexing switch at which call processing may be performed to determine routing information for the call. The routing information may be received at a VoIP media gateway, and the call may be routed through the internet protocol network. Once the call is answered, the connection between the time division multiplexing switch and the VoIP media gateway may be terminated. Terminating the connection enables the number of terminations required on the TDM network to be reduced, thereby creating a more efficient system. The TDM network resources are used only during call setup and are not used during the more lengthy call conversation period.

In one embodiment, the system for processing a call using a time division multiplexing electronic network in cooperation with an internet protocol network may include a first VoIP media gateway configured to receive the call from a call originating device in a time division multiplexing signal, the call being received at the first VoIP media gateway within an internet protocol network. The first VoIP media gateway may also be configured to route the call from the first VoIP media gateway on a first trunk to a time division multiplexing switch at which call processing is performed to determine routing information for the call. Upon completion of call processing, the TDM switch may return the call with routing information back to the first VoIP media gateway on a second trunk, wherein the first and second trunks are different trunks. During call setup, a call reference number, that is used for downstream recording and network management, is passed between the VoIP media gateway and TDM switch. The call reference number may allow the first VoIP Media Gateway to associate the call leg sent out on the first trunk with the call leg received on the second trunk. The first VoIP media gateway may establish a terminating connection from the first VoIP media gateway towards the destination based on the received routing information. The first VoIP media gateway may bridge an originating connection at the first VoIP media gateway with a terminating connection at second VoIP media gateway within the internet protocol network upon a trigger mechanism, which may be, but is not limited to being, receipt of notification that the call has been answered.

The first VoIP media gateway may terminate a connection between the time division multiplexing switch and the first VoIP media gateway upon a trigger mechanism. The connection between the time division multiplexing switch, and the first VoIP media gateway may be terminated upon notification of the call being answered. The connection between the time division multiplexing switch and the first VoIP media gateway may be terminated upon a trigger mechanism such that the time division multiplexing switch is only used for call processing and determining routing information, thereby reducing the load on the time division multiplexing switch. The system may be configured such that the routing of the call may be controlled by the first VoIP media gateway based on the routing information received.

In another embodiment, a method for processing a call using a time division multiplexing electronic network in cooperation with an internet protocol network may be provided. The method may include receiving the call from a call originating device in a time division multiplexing signal, the call being received at a first VoIP media gateway within an internet protocol network and routing the call from the first VoIP media gateway to a time division multiplexing switch at which call processing is performed to determine routing information for the call. The call may be, but is not limited to being, a time division multiplexing call or a VoIP call. The method may further include receiving the routing information at the first VoIP media gateway for routing the call and terminating a connection between the time division multiplexing switch and the first VoIP media gateway upon a trigger mechanism. The method may also include establishing a terminating connection from the first VoIP media gateway based on the received routing information and bridging an originating connection at the first VoIP media gateway with a terminating connection to the second VoIP media gateway within the internet protocol network upon a trigger mechanism. Bridging an originating connection at the first VoIP media gateway with a terminating connection to the second VoIP media gateway within the internet protocol network upon a trigger mechanism may include bridging the originating connection at the first VoIP media gateway with a terminating connection to the second VoIP media gateway within the internet protocol network upon notification of the call being answered.

Terminating a connection between the time division multiplexing switch and the first VoIP media gateway upon identification of the existence of a trigger mechanism may include terminating the connection upon notification of the call being answered. Terminating the connection may also be completed such that the time division multiplexing switch is only used for call processing and to determine routing.

In another embodiment, the step of receiving a call from a call originating device may include receiving a time division multiplexing call from a call originating device on a first trunk. In addition, receiving the routing information at the first VoIP media gateway for routing the call may include receiving the routing information for routing the call at the first VoIP media gateway over a second trunk, wherein the first and second trunks are different trunks. The step of receiving a call from a call originating device at a first VoIP media gateway within an internet protocol network may also include receiving a time division multiplexing call from an intermediate node, which may include, but is not limited to, an end office and an access tandem.

The method may also include controlling routing of the call by the first VoIP media gateway based on the routing information received. The method may also include receiving from the time division multiplexing switch a call reference number to the first VoIP media gateway that is used for downstream recording and downstream billing. In addition, the step of receiving the routing information at the first VoIP media gateway for routing the call may include receiving the routing information at the first VoIP media gateway for routing the call.

According to another exemplary embodiment, a computer-readable medium may include instructions, which, when loaded and executed by an electronic processor, may cause the electronic processor to process a call using a time division multiplexing electronic network in cooperation with an internet protocol network. In particular, the electronic processor may execute the steps of receiving a time division multiplexing call from a call originating device at a first VoIP media gateway within an internet protocol network and routing the call from the first VoIP media gateway to a time division multiplexing switch at which call processing is performed to determine routing information for the call. In addition, the electronic processor may also execute the steps of receiving the routing information at the first VoIP media gateway for routing the call and terminating a connection between the time division multiplexing switch and the first VoIP media gateway upon identification of the existence of a trigger mechanism. The step of terminating the connection between the time division multiplexing switch and the first VoIP media gateway upon a trigger mechanism may include terminating the connection between the time division multiplexing switch and the first VoIP media gateway upon notification of the call being answered. In addition, terminating a connection between the time division multiplexing switch and the first VoIP media gateway upon a trigger mechanism may include terminating a connection between the time division multiplexing switch and the first VoIP media gateway such that the time division multiplexing switch is only used to determine routing, thereby increasing efficiency.

In another embodiment, the computer-readable medium may include instructions, which, when loaded and executed by an electronic processor, causes the electronic processor to execute the step of receiving a time division multiplexing call from a call originating device on a first trunk and receiving the routing information for routing the call at the first VoIP media gateway over a second trunk, wherein the first and second trunks are different trunks. The electronic processor may also execute the step of receiving from the time division multiplexing switch a call reference number to the first VoIP media gateway that may be used for downstream recording and network management. In addition, the electronic processor may also execute the step of receiving the routing information at the first VoIP media gateway for routing the call.

An advantage of the system for processing calls in a network is that because the IP Network handles the routing of the calls, the number of terminations required on the TDM network is reduced, thereby enabling some of the switch terminations to be reserved for future use.

Another advantage of the system for processing calls in a network is that by using the TDM Network to provide call service processing that is not available on the IP Network, the TDM network is assisting in providing call processing functionality to the IP Network that otherwise is unavailable.

These and other features of the passive measurement system are described in the following detailed description, drawings, and appended claims.

DETAILED DESCRIPTION OF THE INVENTION

Figure 1:
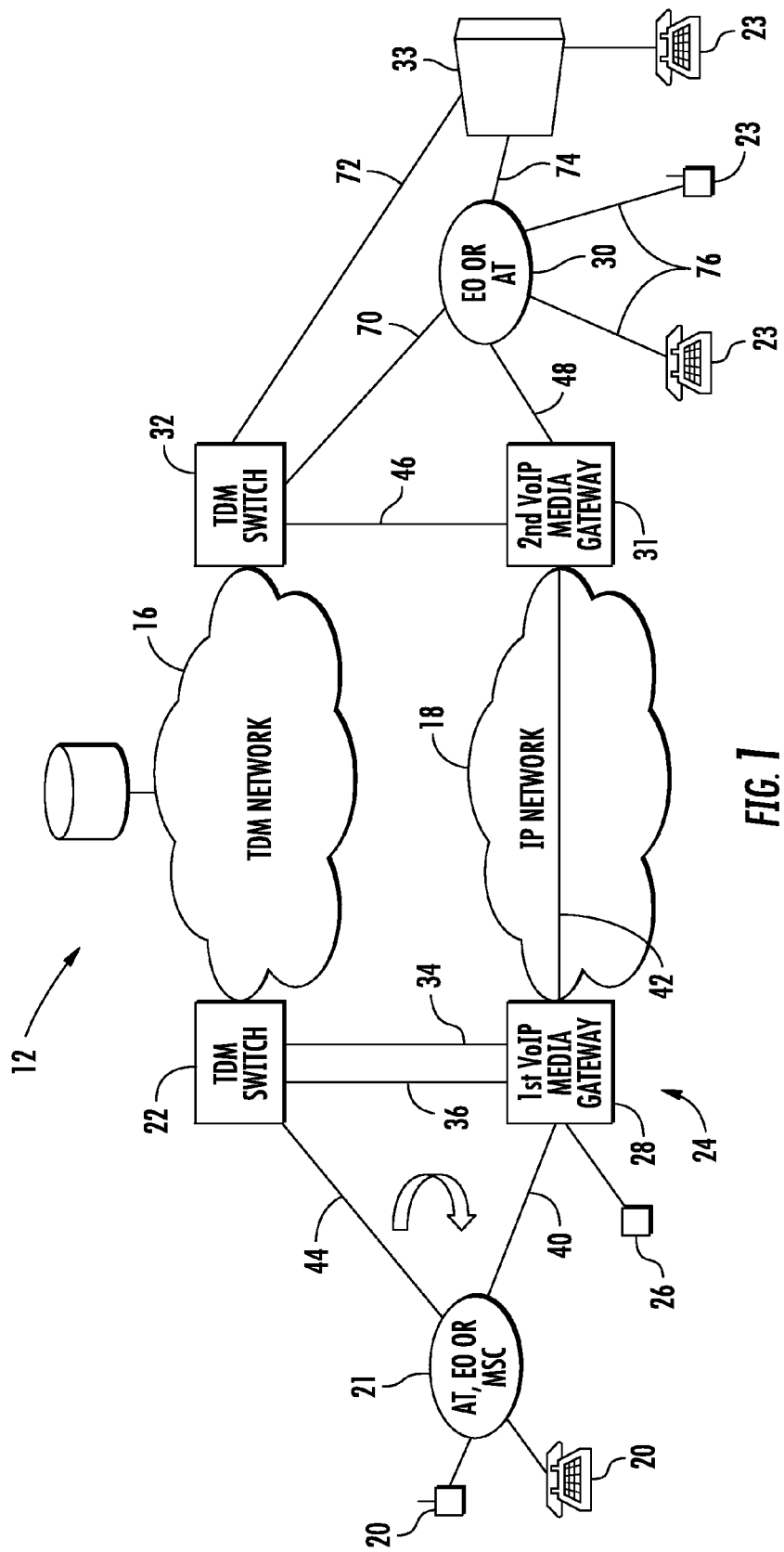
FIG. 1 is a schematic view of a system for processing calls with a time division multiplexing network and for routing the calls via an internet protocol network according to an embodiment of the present invention.
Figure 2:
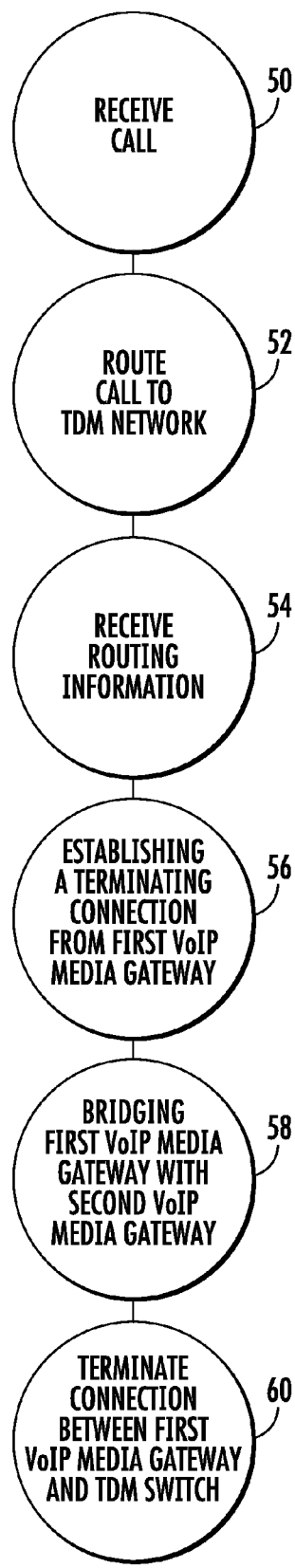
FIG. 2 is a flow chart of the call processing steps of the system for processing calls with a time division multiplexing network and for routing the calls via an internet protocol network.

As shown in FIGS. 1-2, the exemplary embodiments of the present disclosure are described with respect to systems and methods for processing calls in a system 12. The system 12 may be utilized for processing calls with a time division multiplexing (TDM) network 16 and for routing the calls via an internet protocol (IP) network 18. The system 12 may receive a call from a call originating device 20. The call may be routed via intermediate nodes including a first VoIP media gateway 28, to a time division multiplexing switch 22 at which call processing may be performed to determine routing information for the call. The routing information may be received at a first VoIP media gateway 28, and the call may be routed through the internet protocol network 18. Once the call is answered, the first VoIP media gateway 28 may bridge the connection from the call originating device 20 with the connection through the IP network 42, and the first VoIP media gateway 28 may terminate the intermediate connection between the time division multiplexing switch 22 and the first VoIP media gateway 28 to maintain the efficiency of the TDM network 16. Terminating the intermediate connection enhances the efficiency of the system 12. The exemplary embodiments can be applied to other types of systems and methods.

Referring to the drawings and in particular FIG. 1, the system 12 for processing calls in a system 12 is schematically illustrated. The system 12 may include one or more call originating devices 20, at least one TDM network 16 and at least one IP network 18. The call originating device 20 may be a computing device such as, but not limited to, a phone, a computer, an electronic processor, a hand-held device, a personal digital assistant, a mobile device, a cellular phone, a smart phone, a communications device and other devices as described in more detail below. The call originating device 20 may be connected to the TDM network 16 and at least one IP network 18 via an intermediate node 21, which may be, but is not limited to, an end office, an access tandem or a MSC. In particular, the TDM network 16 may be coupled to the intermediate node 21 via trunk 44, and the VoIP media gateway 28 of the IP network 18 may be coupled to the intermediate node 21 via trunk 40.

The TDM network 16 may be any appropriate network for processing calls, such as, but not limited to a plain old telephone system (POTS), but also supports advanced services such as toll free services or virtual private network services. In at least one embodiment, the TDM network 16 may include time division multiplexing (TDM) long distance (LD) switches 22. The switch 22 may generate a call detail record (CDR) with feature information and a call reference value. At least one switch 22 may be in electrical communication with one or more call originating devices 20. The switch 22 may also be in communication with the first VoIP media gateway 28, which may be an IP node, of the IP network 18. The IP network 18 may include the first VoIP media gateway 28 in communication with the call originating device 20 and may include a second VoIP media gateway 31 in communication with a call answering device 23, whereby the first VoIP media gateway 28 may be in communication with the second VoIP media gateway 31 through the IP network 18 via trunk 42. The first VoIP media gateway 28 may generate a call detail record with elapsed time and a call reference value.

The second VoIP media gateway 31 may be in communication with a TDM switch 32 via trunk 46 and may be in communication with an intermediate node 30 via trunk 48. The intermediate node 30 may be in communication with the TDM switch 32 via trunk 70. Call answering devices 23 may be in communication with the second VoIP media gateway 31 via the intermediate node 30 across trunks 76. A call answering device 23 may be in communication with the intermediate node 30 via a private branch exchange (PBX) 33 and trunk 74. The private branch exchange may also be in communication with the TDM switch 32 via trunk 72. The call answering device 23 may be a computing device such as, but not limited to, a phone, a computer, an electronic processor, a hand-held device, a personal digital assistant, a mobile device, a cellular phone, a smart phone, a communications device and other devices. The call answering device 23 may be coupled to the TDM network 16 and the IP network 18 via an intermediate node 30, which may be, but is not limited to being, an end office or an access tandem. A TDM long distance (LD) switch 32 may be in communication with the second VoIP media gateway 31 and in communication with the call answering device 23.

The system 12 for processing a call using the time division multiplexing electronic network 16 in cooperation with an internet protocol network 18 may include a first VoIP media gateway 28. The system 12 may process a call using the TDM network 16 to take advantage of components of the TDM network 16 that are not available on the IP network 18 and then use the IP network 18 to route the call. As such, the resources of the TDM network 16 are not unavailable, but rather, are made available to other calls.

Long distance calls may be routed from call originating devices 20 to a first VoIP media gateway 28. The first VoIP media gateway 28 within an internet protocol network 18 may be configured to receive a call, which may be, but is not limited to being, a time division multiplexing call or a VoIP call, from the call originating device 20 via intermediate node 21 or from call originating device 26 from which a VoIP call may originate. The first VoIP media gateway 28 may route the call from the first VoIP media gateway 28 on a first trunk 34 to a time division multiplexing switch 22 at which call processing is performed to determine routing information for the call. The time division multiplexing switch 22 may then perform call service processing, including, but not limited to, sending queries to an application or service processing element directory, to one or more service network control points and adjuncts. These queries in combination with information from the TDM switch 22 determine the routing of the call. Once the processing is completed, the first VoIP media gateway 28 may receive over a second trunk 36 the routing information for routing the call. The first and second trunks 34, 36 may be different trunks. In another embodiment, the first VoIP media gateway 28 may receive the routing information, over the first truck 34, for routing the call such that the TDM switch 22 sends the routing information to the VoIP media gateway via the first trunk 34 rather than using the second trunk 36. In addition, the routing information may include a call reference number that may be used for downstream recording and network management, such as, but not limited to, network management correlation.

The first VoIP media gateway 28 in the IP network 18 may establish a terminating connection from the first VoIP media gateway 28 based on the received routing information. The first VoIP media gateway 28 may also bridge an originating connection at the first VoIP media gateway 28 with a terminating connection at second VoIP media gateway 31 within the internet protocol network 18 upon a trigger mechanism.

After the call has been handed off to the IP network 18 with routing information, the connection between the time division multiplexing switch 22 and the first VoIP media gateway 28 may be terminated upon a trigger mechanism. In particular, the connection between the time division multiplexing switch 22 and the first VoIP media gateway 28 may be terminated upon receipt of the trigger mechanism by the first VoIP media gateway 28. The trigger mechanism may be, but is not limited to being, an answer to the call. Thus, when the call is answered, the connection between the time division multiplexing switch 22 and the first VoIP media gateway 28 may be terminated to free up terminations on the time division multiplexing switch 22 and the first VoIP media gateway 28. As a result, the time division multiplexing switch 22 may only be used to determine routing, thereby not using the resources of the TDM network 16 unnecessarily and thus, enabling the reduction of terminations required on the TDM network 16. The time division multiplexing switch 22 may only be used for a short period of time necessary to perform call processing and determine routing for the call. The TDM switch 22 may not be used for handling of the routing of the call. The first VoIP media gateway 28 may bridge trunk 40 and VoIP Network facility 42, thereby connecting the call originating device 20 through the intermediate node 21 to the second VoIP media gateway 31.

The system 12 may be used in a method of processing a call using a time division multiplexing electronic network 16 in cooperation with an internet protocol network 18. The method may include at step 50, as shown in FIG. 2, receiving a call, which may be, but is not limited to being a time division multiplexing call or a VoIP call, from a call originating device 20 in a time division multiplexing signal at a first VoIP media gateway 28 within an internet protocol network 18. In one embodiment, the call may be received from a call originating device on a first trunk 34. In another embodiment, the step of receiving the call may include receiving a call from a call originating device 20 through an intermediate node 21. The method may also include at step 52 routing the call from the first VoIP media gateway 28 over an intermediate connection 34 to a time division multiplexing switch 22 at which call processing is performed to determine routing information for the call.

The method may further include at step 54 receiving the routing information at the first VoIP media gateway 28 for routing the call. Receiving the routing information at the first VoIP media gateway 28 may include receiving routing information for routing the call via an IP network 18. In one embodiment, the routing information for routing the call received at the first VoIP media gateway 28 from the time division multiplexing switch 22 may be received at the first VoIP media gateway 28 over a second trunk 36, whereby the first and second trunks 34, 36 are different trunks. The method may also include at step 52 generating a call reference number at the first VoIP media gateway 28, sending the call reference number to the time division multiplexing switch 22 from the first VoIP media gateway 28 and receiving the call reference number at step 54 from the time division multiplexing switch 22, such that the call reference number is used for downstream recording and network management. The method may further include routing of the call by the first VoIP media gateway 28 based on the routing information received. The method may also include, at step 56, establishing a terminating connection from the first VoIP media gateway 28 based on the received routing information. The method may further include, at step 58, bridging an originating connection at the first VoIP media gateway 28 with a terminating connection at second VoIP media gateway 31 within the internet protocol network 18 upon a trigger mechanism.

The method may further include, at step 60, terminating the intermediate connection between the time division multiplexing switch and the VoIP media gateway upon the trigger mechanism. Terminating the intermediate connection between the time division multiplexing switch 22 and the first VoIP media gateway 28 upon a trigger mechanism may include terminating a connection between the time division multiplexing switch 22 and the first VoIP media gateway 28 upon notification of the call being answered. In addition, bridging an originating connection upon a trigger mechanism may include bridging an originating connection upon notification of the call being answered. Terminating the intermediate connection results in the time division multiplexing switch 22 only being used for call processing and to determine routing.

Furthermore, it is important to note that the methods described above may incorporate any of the functionality, devices, and/or features of the systems described above and are not intended to be limited to the description provided above. The methodology and techniques described with respect to the exemplary embodiments can be performed using a machine or other computing device within which a set of instructions, when executed, may cause the machine to perform any one or more of the methodologies discussed above. In some embodiments, the call originating device 20 may be a machine that operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal display (LCD), a flat panel, a solid state display, or a cathode ray tube (CRT)). The machine may include an input device (e.g., a keyboard), a cursor control device (e.g., a mouse), a disk drive unit, a signal generation device (e.g., a speaker or remote control) and a network interface device. The disk drive unit may include a machine-readable medium on which is stored one or more sets of instructions (e.g., software) embodying any one or more of the methodologies or functions described herein, including those methods illustrated above. The instructions may also reside, completely or at least partially, within the main memory, the static memory, and/or within the processor during execution thereof by the machine. The main memory and the processor also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on one or more computer processors. Furthermore, software implementations can include, but not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; non-transitory mediums or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. The figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangements disclosed as the best mode contemplated for carrying out this invention, but that the invention will include all embodiments and arrangements falling within the scope of the appended claims.

We claim:

1. A method of processing a call, comprising:
   receiving the call from a call originating device in a time division multiplexing signal, the call being received at a first voice over internet protocol media gateway within an internet protocol network;
   routing the call from the first voice over internet protocol media gateway over an intermediate connection to a time division multiplexing switch at which call processing is performed to determine routing information for the call;
   receiving the routing information at the first voice over internet protocol media gateway from the time division multiplexing switch for routing the call;
   bridging, by utilizing instructions stored in memory and executed by a processor of the first internet protocol media gateway, an originating connection at the first voice over internet protocol media gateway with a terminating connection at a second voice over internet protocol media gateway within the internet protocol network based on a trigger mechanism; and
   terminating the intermediate connection between the time division multiplexing switch and the first voice over internet protocol media gateway based on the trigger mechanism;
   wherein routing the call comprises routing the call from the first voice over internet protocol media gateway to the time division multiplexing switch on a first trunk, and wherein receiving the routing comprises receiving the routing information from the time division multiplexing switch over a second trunk, wherein the first and second trunks are different trunks.

2. The method of claim 1, wherein receiving the call comprises receiving a time division multiplexing call.

3. The method of claim 1, wherein the call received from the call originating device is a voice over internet protocol call.

4. The method of claim 1, wherein the trigger mechanism comprises a notification of the call being answered.

5. The method of claim 1, further comprising:
   generating a call reference number at the first voice over internet protocol media gateway;
   sending the call reference number to the time division multiplexing switch from the first voice over internet protocol media gateway; and
   receiving the call reference number from the time division multiplexing switch, such that the call reference number is used for downstream recording and network management.

6. The method of claim 1, wherein receiving the call comprises receiving the call through an intermediate node.

7. The method of claim 1, wherein the intermediate connection is such that the time division multiplexing switch is only used for call processing to determine routing.

8. A system for processing a call, comprising:
   a memory that stores instructions;
   a first voice over internet protocol media gateway in communication with a processor that executes the instructions to perform operations, the operations comprising:
   receiving the call from a call originating device in a time division multiplexing signal, the call being received at the first voice over internet protocol media gateway within an internet protocol network;
   routing the call from the first voice over internet protocol media gateway on a first trunk to a time division multiplexing switch at which call processing is performed to determine routing information for the call;
   receiving the routing information for routing the call at the first voice over internet protocol media gateway over a second trunk, wherein the first and second trunks are different trunks;
   bridging an originating connection at the first voice over internet protocol media gateway with a terminating connection at a second voice over internet protocol media gateway within the internet protocol network based on a trigger mechanism; and
   terminating an intermediate connection between the time division multiplexing switch and the first voice over internet protocol media gateway based on the trigger mechanism;
   wherein routing the call comprises routing the call from the first voice over internet protocol media gateway to the time division multiplexing switch on a first trunk, and wherein receiving the routing comprises receiving the routing information from the time division multiplexing switch over a second trunk, wherein the first and second trunks are different trunks.

9. The system of claim 8, wherein the intermediate connection is terminated based on a notification of the call being answered.

10. The system of claim 8, wherein the routing of the call is controlled by the first voice over internet protocol media gateway based on the routing information.

11. The system of claim 8, wherein the call originating device is coupled to the first voice over internet protocol media gateway within the internet protocol network through an intermediate node.

12. The system of claim 8, wherein the intermediate connection is terminated such that the time division multiplexing switch is only used for call processing to determine routing.

13. A computer-readable device comprising instructions, which, when loaded and executed by a processor, cause the processor to perform operations, comprising:

receiving a call from a call originating device in a time division multiplexing signal, the call being received at a first voice over internet protocol media gateway within an internet protocol network;

routing the call from the first voice over internet protocol media gateway over an intermediate connection to a time division multiplexing switch at which call processing is performed to determine routing information for the call;

receiving the routing information at the first voice over internet protocol media gateway for routing the call;

bridging a originating connection at the first voice over internet protocol media gateway with a terminating connection at a second voice over internet protocol media gateway within the internet protocol network based on a trigger mechanism; and terminating the intermediate connection between the time division multiplexing switch and the first voice over internet protocol media gateway based on the trigger mechanism;

wherein routing the call comprises routing the call from the first voice over internet protocol media gateway to the time division multiplexing switch on a first trunk, and wherein receiving the routing comprises receiving the routing information from the time division multiplexing switch over a second trunk, wherein the first and second trunks are different trunks.

14. The computer-readable device of claim 13, wherein the trigger mechanism comprises notification of the call being answered.

15. The computer-readable device of claim 13, wherein routing the call comprises routing the call from the first voice over internet protocol media gateway to the time division multiplexing switch on a first trunk, and wherein receiving the routing information comprises receiving the routing information from the time division multiplexing switch over a second trunk, wherein the first and second trunks are different trunks.

16. The computer-readable device of claim 13, wherein the intermediate connection is terminated such that the time division multiplexing switch is only used for call processing to determine routing.

17. The method of claim 1, further comprising generating a call detail record comprising an elapsed time.

18. The system of claim 8, wherein the operations further comprise sending a call reference number to the time division multiplexing switch.

19. The computer-readable device of claim 13, wherein the operations further comprise receiving a call reference number from the time division multiplexing switch, such that the call reference number is used for downstream recording and network management.

* * * * *